(12) United States Patent
Ashitani (10) Patent No.: US 11,575,839 B2
(45) Date of Patent: Feb. 7, 2023

(54) APPARATUS, METHOD OF CONTROLLING THE APPARATUS, AND PROGRAM (71) Applicant: CANON KABUSHIKI KAISHA, Tokyo (JP)

(72) Inventor: Satoshi Ashitani, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/487,657

(22) Filed: Sep. 28, 2021

(65) Prior Publication Data
US 2022/0116541 A1    Apr. 14, 2022

(30) Foreign Application Priority Data

Oct. 8, 2020 (JP) .............................. JP2020-170628

(51) Int. Cl.
H04N 5/232 (2006.01)
H04N 5/262 (2006.01)

(52) U.S. Cl.
CPC ..... *H04N 5/23296* (2013.01); *H04N 5/23203* (2013.01); *H04N 5/23299* (2018.08); *H04N 5/2628* (2013.01)

(58) Field of Classification Search
None
See application file for complete search history.

(56) References Cited

U.S. PATENT DOCUMENTS

| 2013/0222651 | A1* | 8/2013 | Kagei | H04N 5/262 348/335 |
| 2015/0022680 | A1* | 1/2015 | Idaka | H04N 5/23216 348/211.4 |
| 2015/0156422 | A1* | 6/2015 | Neufeld | H04N 5/23296 348/240.3 |
| 2016/0142640 | A1* | 5/2016 | Niida | H04N 5/23218 348/240.3 |
| 2017/0201691 | A1* | 7/2017 | Wakazono | H04N 5/23296 |
| 2018/0234613 | A1* | 8/2018 | Fukunaga | F16M 11/22 |

FOREIGN PATENT DOCUMENTS

JP    2007282069 A    10/2007

* cited by examiner

*Primary Examiner* — Twyler L Haskins
*Assistant Examiner* — Dwight Alex C Tejano
(74) *Attorney, Agent, or Firm* — Canon U.S.A., Inc. IP Division (57) ABSTRACT An apparatus includes an imaging unit that captures an image, a zoom drive unit that controls an angle of view of the imaging unit, a pan drive unit that rotates the imaging unit in a pan direction, a tilt drive unit that rotates the imaging unit in a tilt direction, and a control unit that controls the pan drive unit and the tilt drive unit. The control unit controls accelerations or decelerations of the pan drive unit and the tilt drive unit based on the angle of view controlled by the zoom drive unit so that an acceleration time or a deceleration time of movement of a video shot by the imaging unit is made constant.

14 Claims, 9 Drawing Sheets

APPARATUS, METHOD OF CONTROLLING THE APPARATUS, AND PROGRAM

BACKGROUND OF THE DISCLOSURE

Field of the Disclosure

The aspect of the embodiments relates to an imaging apparatus, a video delivery system, a method of controlling the imaging apparatus, and a program.

Description of the Related Art

Some monitoring systems and video delivery systems use cameras provided with pan-tilt (hereinafter also abbreviated to PT) mechanisms that rotate camera head units, which can be controlled through remote control via networks or dedicated lines. Such a camera includes a pan mechanism that performs horizontal rotation drive and a tilt mechanism that performs vertical rotation drive. Pan-tilt zoom (hereinafter also abbreviated to PTZ) cameras capable of electric zoom can vary their shooting directions and their shooting angles of view and the PTZ cameras shoot moving objects. Since the PTZ cameras are used in various scenes, their zooms are varied to the ones suitable for the objects. Since the size of the angle of view is also varied in association with the variation of the zoom, the pan-tilt speed may be varied in accordance with the angle of view. Specifically, in order to reduce a feeling of strangeness for a user, the pan-tilt speed may be controlled so as to be increased when the angle of view is wide (wide angle) and the pan-tilt speed may be controlled so as to decreased when the angle of view is narrow (telephotograph) so that the visual motion of a video is made constant regardless of the angle of view.

Japanese Patent Laid-Open No. 2007-282069 discloses a method of calculating the PT speed at a zoom position that is calculated in advance using the relationship between the zoom position and the angle of view for various lenses having different angles of view.

If the acceleration or the deceleration to a target pan speed (or a target tilt speed) is fixed regardless of the angle of view when the pan speed (or the tilt speed) until the shooting direction of the camera is directed to a target position is varied with the angle of view, the acceleration time or the deceleration time to the target pan speed (or the target tilt speed) is varied with the angle of view. As a result, the visual motion in a video during acceleration or deceleration may be varied with the angle of view.

SUMMARY OF THE DISCLOSURE

An apparatus includes an imaging unit that captures an image, a zoom drive unit that controls an angle of view of the imaging unit, a pan-tilt drive unit that rotates the imaging unit in a pan direction and a tilt direction, and a control unit that controls the rotation of the pan-tilt drive unit in the pan direction and the tilt direction. The control unit controls an acceleration or a deceleration of the drive unit based on the angle of view controlled by the zoom drive unit so that an acceleration time or a deceleration time of the rotation of the pan-tilt drive unit is made constant.

Further features of the disclosure will become apparent from the following description of exemplary embodiments with reference to the attached drawings.

DESCRIPTION OF THE EMBODIMENTS

Embodiments of the present disclosure will herein be described with reference to the drawings.

First Embodiment

Figure 1:
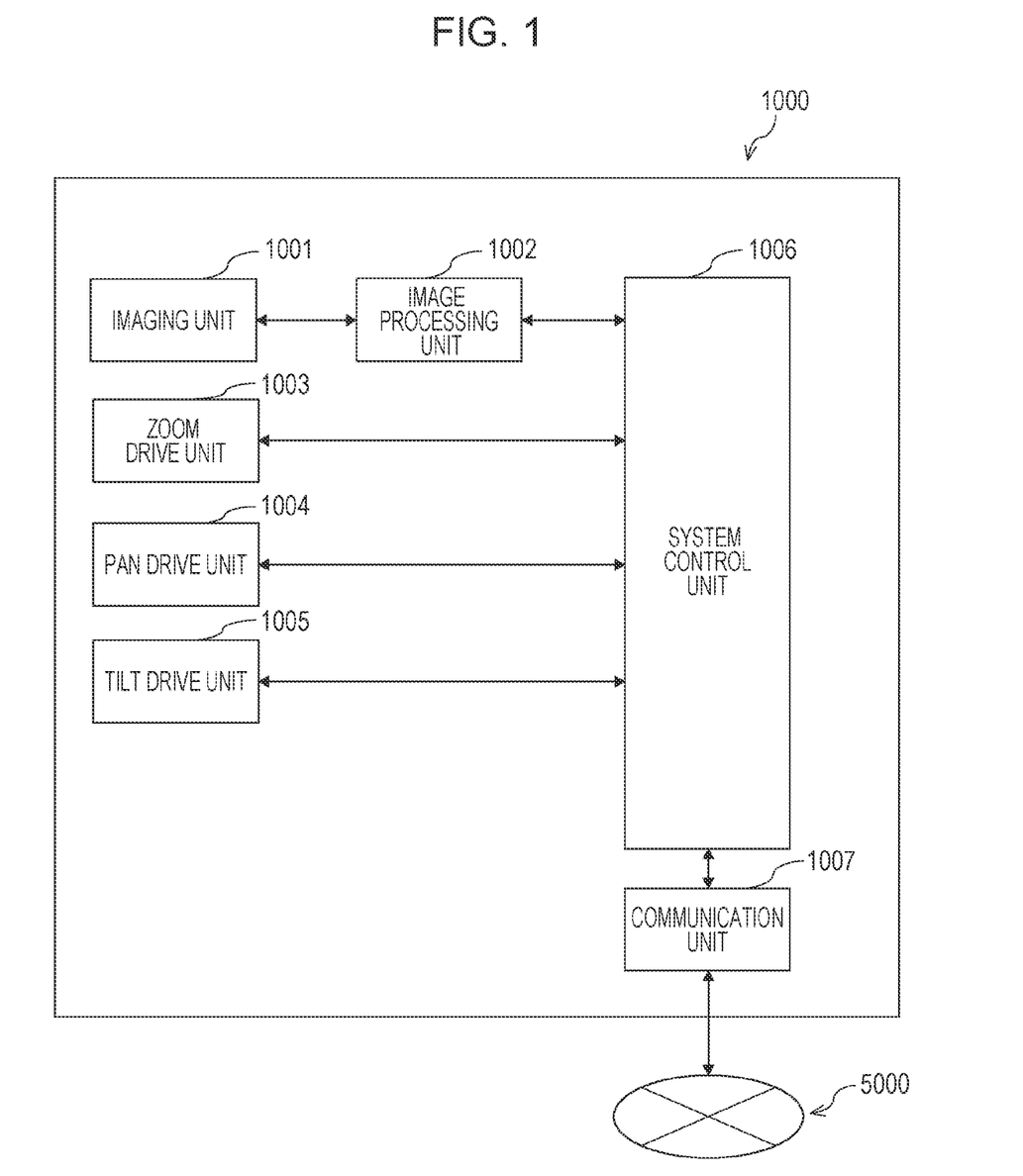
FIG. 1 is a block diagram for describing the configuration of an imaging apparatus according to a first embodiment.
Figure 2A:
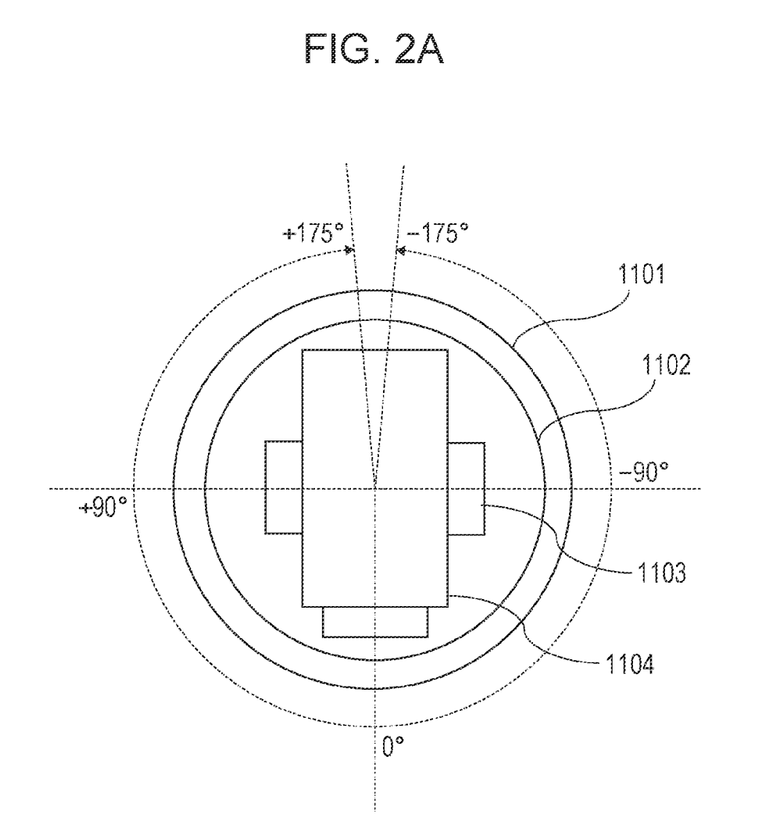
FIG. 2A is a plan view of the imaging apparatus according to the first embodiment and FIG. 2B is a side view of the imaging apparatus according to the first embodiment.
Figure 2B:
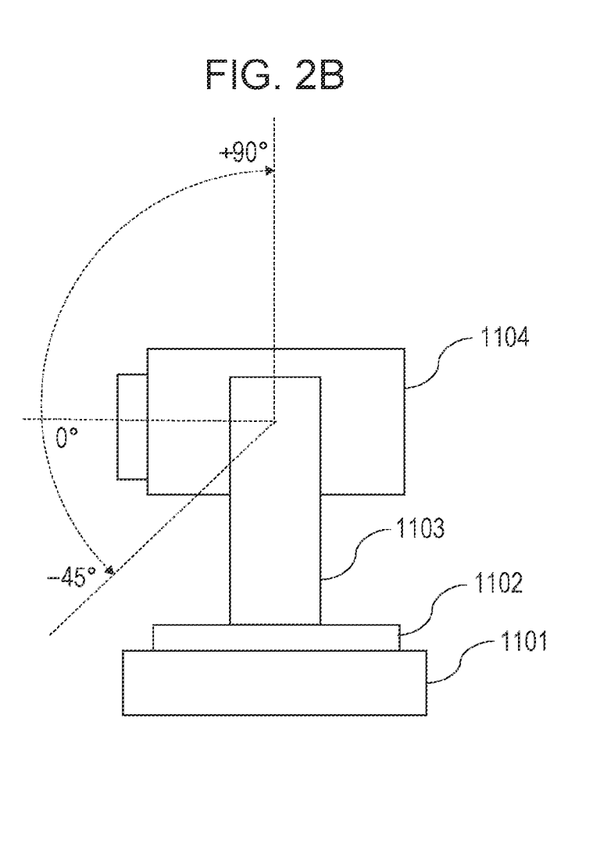

FIG. 1 is a block diagram for describing the configuration of an imaging apparatus 1000 according to a first embodiment. FIG. 2A is a plan view illustrating the imaging apparatus 1000. FIG. 2B is a side view illustrating the imaging apparatus 1000. The imaging apparatus 1000 includes an imaging unit 1001, an image processing unit 1002, a zoom drive unit 1003, a pan drive unit 1004, a tilt drive unit 1005, a system control unit 1006, and a communication unit 1007.

The imaging unit 1001 captures an image of an object. The imaging unit 1001 includes a lens, an imaging device, and a control circuit unit for the imaging device and is electrically connected to the image processing unit 1002. The imaging unit 1001 receives light from the object the image of which is formed by an imaging optical system of the lens and converts an optical image of the object into an electrical signal through photoelectric conversion.

The image processing unit 1002 acquires the signal subjected to the photoelectric conversion in the imaging unit 1001 to generate image data subjected to development, encoding, and so on. The image processing unit 1002 can perform an image clipping process, such as electronic pan-tilt control. The image processing unit 1002 is connected to the system control unit 1006 and supplies the generated image data to the system control unit 1006.

The zoom drive unit 1003 controls an imaging angle of view of the imaging unit 1001. Specifically, the zoom drive unit 1003 varies a shooting angle of view of the imaging unit 1001. The zoom drive unit 1003 is connected to the system control unit 1006 and includes a lens mechanism that performs optical zoom and a stepping motor, such as an electric motor, which is an actuator.

The pan drive unit 1004 is a driving unit that performs a pan operation of the imaging apparatus 1000. The pan drive unit 1004 is connected to the system control unit 1006 so as to be communicable with the system control unit 1006. The pan drive unit 1004 performs pan drive with a mechanism that performs the pan operation, an electric motor, such as a stepping motor, which is an actuator, and an encoder that detects a panning angle. In the first embodiment, the pan drive unit 1004 is included in a bottom case 1101 or a turntable 1102 described below.

The bottom case 1101 functions as a base of the entire imaging apparatus 1000 including the pan drive unit 1004. The bottom case 1101 is arranged under the turntable 1102.

The turntable 1102 rotates around a vertical axis, which is used as a central axis, with a camera head support 1103 described below and so on being loaded to perform driving in a pan direction, that is, the pan operation of the imaging apparatus 1000. The turntable 1102 is capable of rotating in the pan direction from −175 degrees to +175 degrees.

In other words, the pan drive unit 1004 can include the mechanism that performs the pan operation, the actuator, and the encoder in the bottom case 1101 or the turntable 1102. This enables the imaging unit 1001 to rotate in the pan direction from −175 degrees to +175 degrees. Although the pan drive unit 1004 is included in the bottom case 1101 or the turntable 1102 in the first embodiment, another configuration may be adopted.

The tilt drive unit 1005 is a driving unit that performs a tilt operation of the imaging apparatus 1000. The tilt drive unit 1005 is connected to the system control unit 1006 so as to be communicable with the system control unit 1006. The tilt drive unit 1005 performs tilt drive with a mechanism that performs the tilt operation, an electric motor, such as a stepping motor, which is an actuator, and an encoder that detects a tilting angle. In the first embodiment, the tilt drive unit 1005 is included in the camera head support 1103 or a camera head 1104 described below.

The camera head support 1103 is a support post supporting the camera head 1104. The camera head support 1103 is arranged around the central axis of the turntable 1102 and is connected to the camera head 1104 at the opposite side of the turntable 1102.

The camera head 1104 is an independent imaging unit of the imaging apparatus 1000. The imaging unit 1001, which is the imaging unit, and the zoom drive unit 1003, which is a zoom drive unit, are arranged in the camera head 1104. The camera head 1104 performs driving in a tilt direction, that is, the tilt operation of the imaging apparatus 1000 around an axis perpendicular to the vertical axis, which is used as the central axis. The camera head 1104 is capable of rotating from −45 degrees in an obliquely downward direction to +90 degrees in an upward direction with respect to the horizontal direction, which is 0 degrees.

In other words, the tilt drive unit 1005 can include the mechanism that performs the tilt operation, the actuator, and the encoder in the camera head support 1103 or the camera head 1104. This enables the imaging unit 1001 to rotate from −45 degrees in the obliquely downward direction to +90 degrees in the upward direction. Although the tilt drive unit 1005 is included in the camera head support 1103 or the camera head 1104 in the first embodiment, another configuration may be adopted.

As described above, the imaging apparatus 1000 of the first embodiment can rotate the camera head 1104 in the pan direction and the tilt direction to vary the shooting direction for shooting. The driving ranges in the pan direction and the tilt direction in the first embodiment are only examples and the driving ranges in the pan direction and the tilt direction are not limited to the above ones. The pan drive unit 1004 and the tilt drive unit 1005 are used as a pan-tilt drive unit that performs pan-tilt drive. Since performing the pan-tilt drive drives the imaging unit 1001, a video that is shot is subjected to video movement. The video movement means that a video that is shot by the imaging unit moves. Specifically, the video movement makes it seem as though a video that is shot is moving by operating the imaging unit 1001 or the like or performing a clipping process or the like from the video that is shot.

The system control unit 1006 controls the entire imaging apparatus 1000. The system control unit 1006 includes a central processing unit (CPU). The system control unit 1006 is connected to a client apparatus, which is an information processing apparatus (not illustrated), via the communication unit 1007 and exchange a command and a response with the client apparatus to control the imaging apparatus 1000. Specifically, the system control unit 1006 receives a camera control command transmitted from the client apparatus, analyzes the acquired camera control command, and performs a process corresponding to the command. Then, the system control unit 1006 transmits a response to the camera control command to the client apparatus. For example, the system control unit 1006 controls the image processing unit 1002 based on the instruction in an image quality adjustment command and controls the pan drive unit 1004, the tilt drive unit 1005, and the zoom drive unit 1003 based on the instruction in a PTZ command for operating the PTZ.

The communication unit 1007 is connected to a network 5000 and can exchange an instruction or the like from the system control unit 1006 with the client apparatus (not illustrated). The communication unit 1007 receives a command from the client apparatus via the network 5000 and transmits a response from the system control unit 1006 to the client apparatus via the network 5000.

Figure 3:
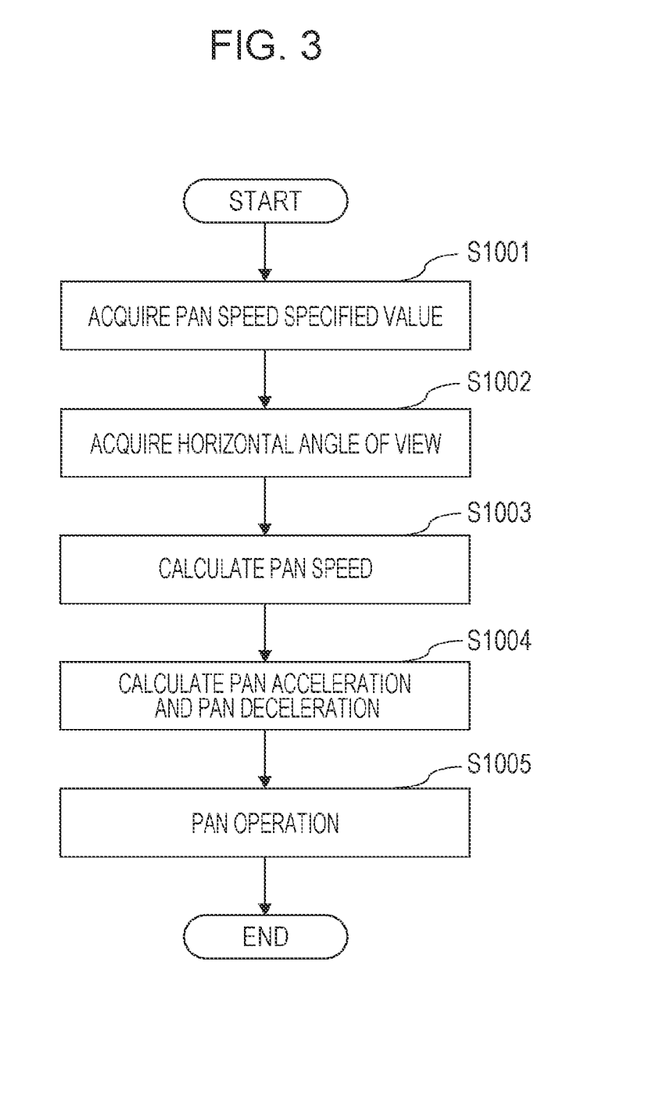
FIG. 3 is a flowchart indicating a pan control process in the imaging apparatus according to the first embodiment.

FIG. 3 is a flowchart indicating pan control in the imaging apparatus 1000. The flowchart in FIG. 3 is started upon reception of a pan drive instruction when a pan speed specification by an angle of view ratio, an acceleration time, and a deceleration time are set in the imaging apparatus 1000. Although the pan drive is described here, the same process is applicable to the tilt drive.

Figure 4A:
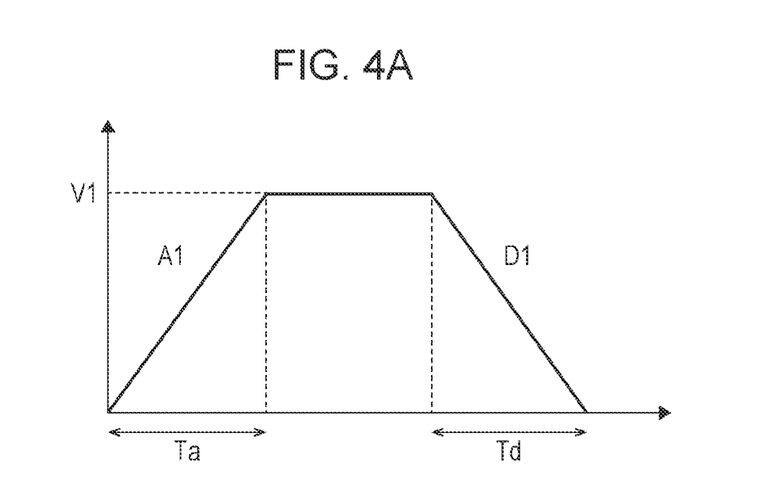
FIG. 4A and FIG. 4B are graphs indicating acceleration-deceleration control at different angles of view in the imaging apparatus according to the first embodiment.
Figure 4B:
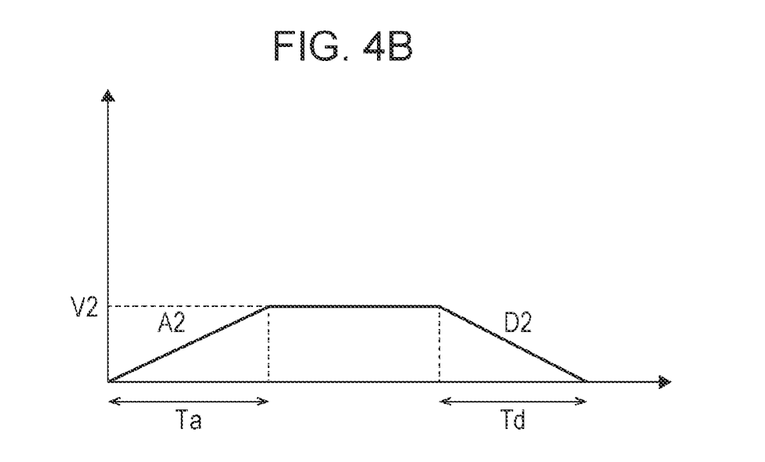

FIG. 4A and FIG. 4B are graphs indicating acceleration-deceleration control at two angles of view. FIG. 4A is a graph indicating a pan acceleration-deceleration setting when the horizontal angle of view is 60 degrees (when the angle of view is wide) and FIG. 4B is a graph indicating the pan acceleration-deceleration setting when the horizontal angle of view is 20 degrees (when the angle of view is narrow). Referring to FIG. 4A and FIG. 4B, V1 denotes a target pan speed when the horizontal angle of view is 60 degrees and V2 denotes a target pan speed when the horizontal angle of view is 20 degrees. Similarly, A1 denotes a pan acceleration when the horizontal angle of view is 60 degrees, A2 denotes a pan acceleration when the horizontal angle of view is 20 degrees, D1 denotes a pan deceleration when the horizontal angle of view is 60 degrees, and D2 denotes a pan deceleration when the horizontal angle of view is 20 degrees. Ta denotes an acceleration time and Td denotes a deceleration time. Ta and Td when the horizontal angle of view is 60 degrees are equal to Ta and Td when the horizontal angle of view is 20 degrees.

Referring to FIG. 3, in Step S1001, the system control unit 1006 acquires the current pan speed specified value. For example, the system control unit 1006 acquires 50%/second (hereinafter abbreviated to s) as the pan speed specified value by the angle of view ratio.

In Step S1002, the system control unit 1006 acquires the current horizontal angle of view of the zoom drive unit 1003. For example, the system control unit 1006 acquires 60 degrees as the current horizontal angle of view.

In Step S1003, the system control unit 1006 calculates the pan speed from the acquired horizontal angle of view. The pan speed is represented by a product of the pan speed specified value and the horizontal angle of view. For example, the pan speed V1 is calculated from the horizontal angle of view (60 degrees) acquired in Step S1002 and the pan speed specified value (50%/s) by the angle of view ratio acquired in Step S1001 as follows: V1=50%/s×60 degrees=30 degrees/s. When the horizontal angle of view acquired in Step S1002 is 20 degrees, the pan speed V2 is calculated as follows: V2=50%/s×20 degrees=10 degrees/s.

In Step S1004, the system control unit 1006 calculates the pan acceleration and the pan deceleration from the calculated pan speeds and the acceleration time and the deceleration time that are set. The pan acceleration and the pan deceleration are represented by a quotient resulting from division of the pan speed by the pan acceleration time and a quotient resulting from division of the pan speed by the pan deceleration time, respectively. For example, the pan acceleration A1 is calculated from the pan speed V1 of 30 degrees/s calculated in Step S1003 when the horizontal angle of view is 60 degrees and the acceleration time Ta of 1 s as follows: A1=30 degrees/s/1 s=30 degrees/s2. Similarly, the pan acceleration A2 is calculated from the pan speed V2 of 10 degrees/s when the horizontal angle of view is 20 degrees and the acceleration time Ta of 1 s as follows: A2=10 degrees/s/1 s=10 degrees/s2.

The pan deceleration D1 is calculated from the pan speed V1 of 30 degrees/s calculated in Step S1003 when the horizontal angle of view is 60 degrees and the deceleration time Td of is as follows: D1=30 degrees/s/is =30 degrees/s2. Similarly, the pan deceleration D2 is calculated from the pan speed V2 of 10 degrees/s when the horizontal angle of view is 20 degrees and the acceleration time Td of is as follows: D2=10 degrees/s/is =10 degrees/s2. As described above, the acceleration of the pan speed and the deceleration of the pan speed are increased when the angle of view is increased by the zoom drive unit 1003 and the acceleration of the pan speed and the deceleration of the pan speed are decreased when the angle of view is decreased by the zoom drive unit 1003. As a result, the acceleration time and the deceleration time are kept constant even when the pan speeds are varied.

Figure 5:
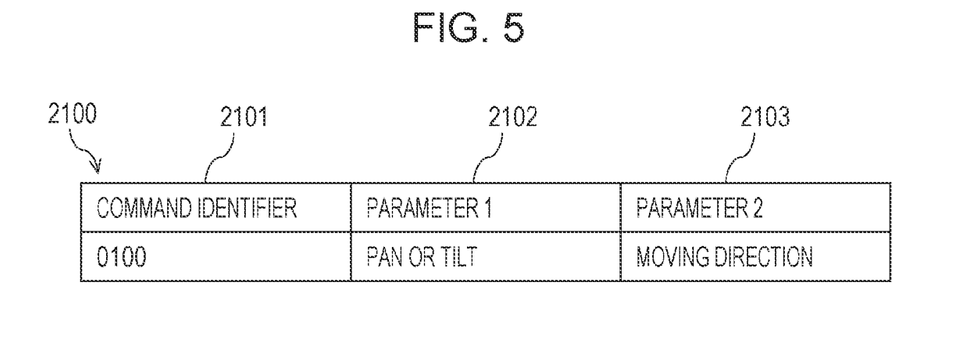
FIG. 5 is a table indicating a command for a pan-tilt drive instruction in the imaging apparatus.
Figure 6:
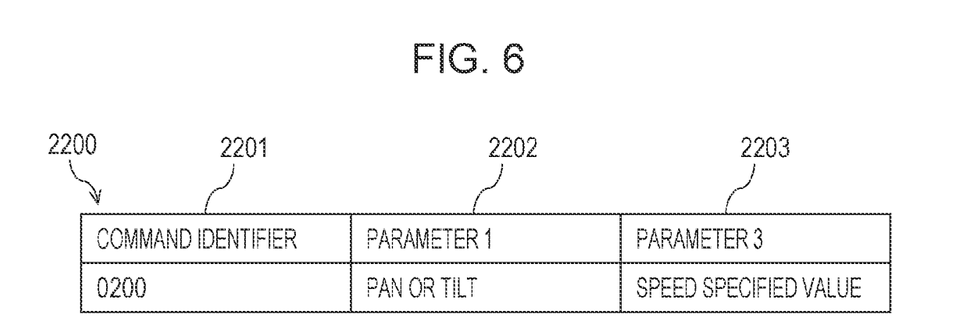
FIG. 6 is a table indicating a command for a pan-tilt speed specification by the angle of view ratio in the imaging apparatus.
Figure 7:
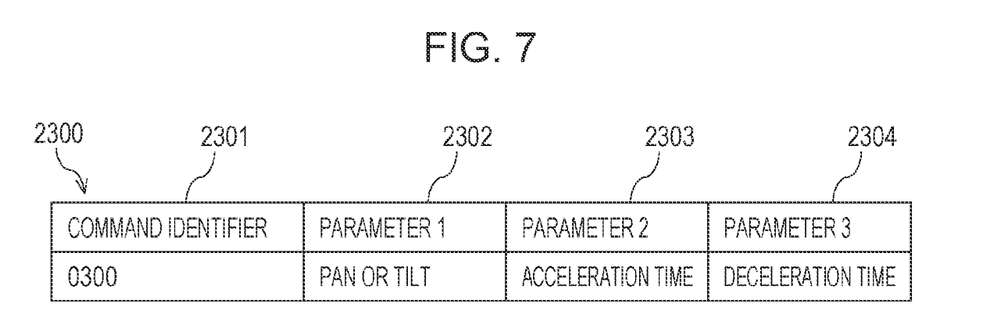
FIG. 7 is a table indicating a command for pan-tilt acceleration-deceleration time settings in the imaging apparatus.

In Step S1005, the system control unit 1006 controls the pan drive unit 1004 based on the pan speed, the pan acceleration, and the pan deceleration, which are calculated, and controls the tilt drive unit 1005 based on a tilt speed, a tilt acceleration, and a tilt deceleration, which are calculated. FIG. 5 is a table indicating a command for a pan-tilt drive instruction. FIG. 6 is a table indicating a command for a pan-tilt speed specification by the angle of view ratio. FIG. 7 is a table indicating a command for pan-tilt acceleration-deceleration time settings. The system control unit 1006 interprets a control command received from the client apparatus based on the values calculated in Step S1003 and Step S1004 to perform the specified control. A command 2100 indicating the pan-tilt drive instruction, a command 2200 indicating the pan-tilt speed specification by the angle of view ratio, and a command 2300 indicating the pan-tilt acceleration-deceleration time settings are used as the control commands.

The command 2100 is a command for the pan-tilt drive instruction. The command 2100 includes a command identifier 2101, a parameter 2102, and a parameter 2103.

The command identifier 2101 is a command for identifying the kind of the command. For example, "0100" indicates a command for instructing the pan-tilt drive. The parameter 2102 is a parameter indicating the direction type. A value indicating the pan or the tilt is specified for the parameter 2102. The parameter 2103 is a parameter indicating the moving direction. A value indicating right or left is specified as the moving direction in the pan drive and a value indicating the upward direction or the downward direction is specified as the moving direction in the tilt drive.

The command 2200 is a command indicating the pan-tilt speed specification by the angle of view ratio. The command 2200 includes a command identifier 2201, a parameter 2202, and a parameter 2203.

The command identifier 2201 is a command for identifying the kind of the command. For example, "0200" indicates a command for specifying the pan-tilt speed by the angle of view ratio. The parameter 2202 is a parameter indicating the direction type. A value indicating the pan or the tilt is specified for the parameter 2202. The parameter 2203 is a parameter indicating the speed specified value. For example, a value from "0%/s to 100%/s" is specified as the speed specified value by the angle of view ratio.

The command 2300 is a command indicating the pan-tilt acceleration-deceleration time settings. The command 2300 includes a command identifier 2301, a parameter 2302, a parameter 2303, and a parameter 2304.

The command identifier 2301 is a command for identifying the kind of the command. For example, "0300" indicates a command for setting the acceleration time and the deceleration time of the PT. The parameter 2302 is a parameter indicating the direction type. A value indicating the pan or the tilt is specified for the parameter 2302. The parameter 2303 is a parameter indicating the acceleration time. The time required to accelerate to a specified speed is specified for the parameter 2303 in units of milliseconds. The parameter 2304 is a parameter indicating the deceleration time. The time required to decelerate to a specified speed is specified for the parameter 2304 in units of milliseconds.

All the parameters in each command may be input by a user or part or all of the parameters may be automatically specified. For example, a setting unit used by the user to set the acceleration time in the parameter 2303 may be provided.

As described above, with the imaging apparatus 1000 of the first embodiment, it is possible to set the acceleration and the deceleration so that the acceleration time and the deceleration time are kept constant when the pan-tilt speed by the angle of view ratio is specified in the imaging apparatus capable of the PTZ. Accordingly, a video that is shot moves in the same manner during acceleration and deceleration of the PT operation even when the horizontal angle of view is varied by the zoom drive.

Second Embodiment

Figure 8:
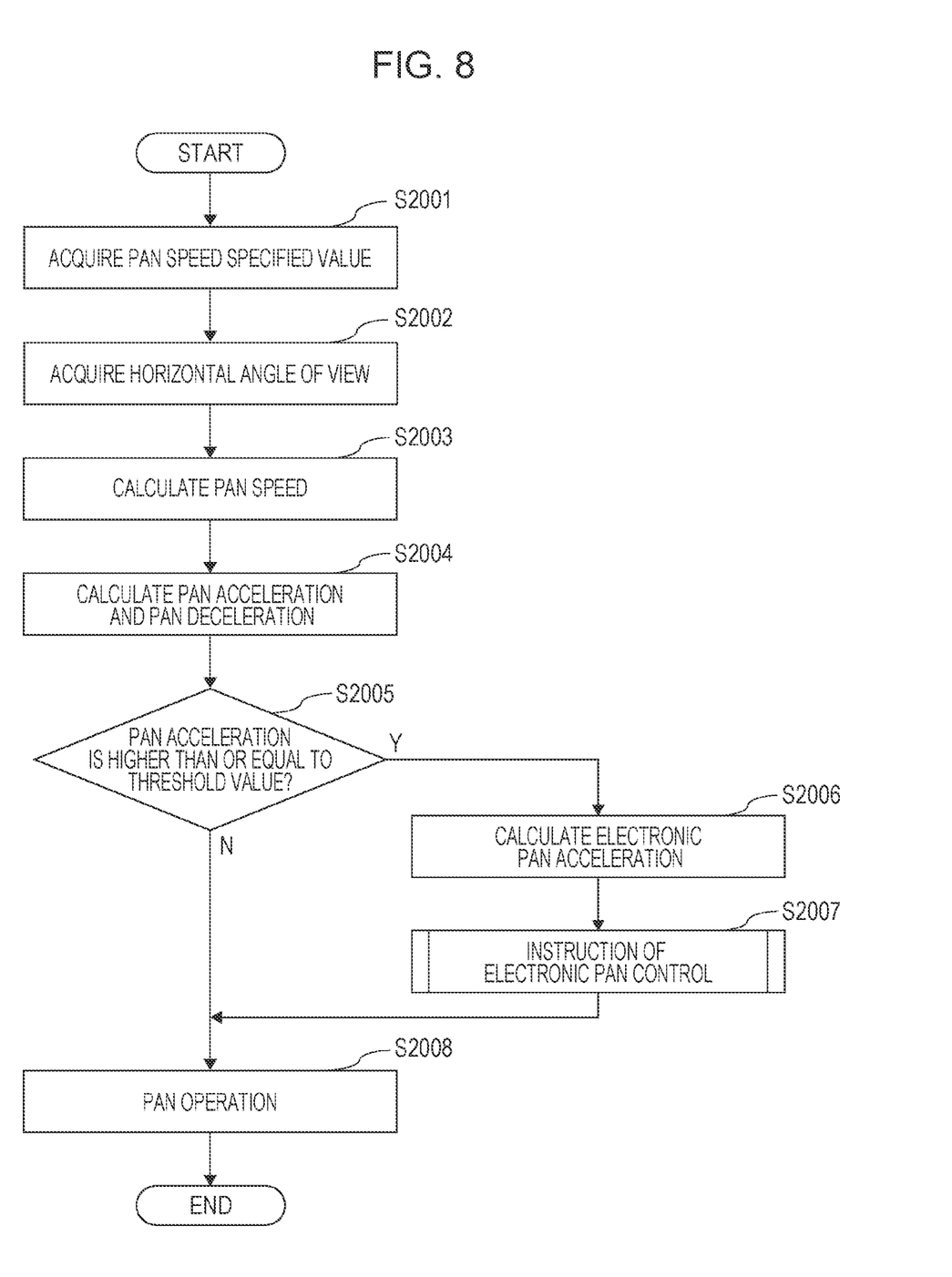
FIG. 8 is a flowchart indicating the pan control process in an imaging apparatus according to a second embodiment.

An imaging apparatus 2000 according to a second embodiment uses the electronic pan-tilt control, in addition to the pan-tilt drive unit. The imaging apparatus 2000 can clip a video that is shot at an arbitrary position to move the position of the video to be displayed. The same reference numerals are added to the same components as in the first embodiment and a description of such components is appropriately omitted. FIG. 8 is a flowchart indicating the pan control in the imaging apparatus 2000 of the second embodiment. The flowchart in FIG. 8 is started upon reception of the pan drive instruction when the speed specification by the angle of view ratio, the acceleration time, and the deceleration time are set in the imaging apparatus 2000.

Referring to FIG. 8, in Step S2001, the system control unit 1006 acquires the current pan speed specified value. For example, the system control unit 1006 acquires 100%/s as the pan speed specified value by the angle of view ratio.

In Step S2002, the system control unit 1006 acquires the current horizontal angle of view of the zoom drive unit 1003. For example, the system control unit 1006 acquires 120 degrees as the current horizontal angle of view.

In Step S2003, the system control unit 1006 calculates the pan speed from the acquired horizontal angle of view. The pan speed is represented by a product of the pan speed specified value and the horizontal angle of view. For example, the pan speed is calculated from the horizontal angle of view (120 degrees) acquired in Step S2002 and the pan speed specified value (100%/s) by the angle of view ratio acquired in Step S2001 as follows: the pan speed=100%/s×120 degrees=120 degrees/s.

In Step S2004, the system control unit 1006 calculates the pan acceleration and the pan deceleration from the calculated pan speed and the acceleration time and the deceleration time that are set. The pan acceleration and the pan deceleration are represented by a quotient resulting from division of the pan speed by the pan acceleration time and a quotient resulting from division of the pan speed by the pan deceleration time, respectively. For example, the pan acceleration is calculated from the pan speed (120 degrees/s) calculated in Step S2003 when the horizontal angle of view is 120 degrees and the pan acceleration time of 0.2 s as follows: the pan acceleration=120 degrees/s/0.2 s=600 degrees/s2.

The pan deceleration is calculated from the pan speed (120 degrees/s) calculated in Step S2003 when the horizontal angle of view is 120 degrees and the pan deceleration time of 0.2 s as follows: the pan deceleration=120 degrees/s/0.2 s=600 degrees/s2.

In Step S2005, the system control unit 1006 determines whether the pan acceleration is higher than or equal to a predetermined acceleration indicating an acceleration performance limit of the pan drive unit, that is, whether the pan acceleration is higher than or equal to a threshold value. The pan control process goes to Step S2006 if the pan acceleration is higher than or equal to the predetermined acceleration and the pan control process goes to Step S2008 if the pan acceleration is lower than the threshold value. For example, if the pan acceleration is 600 degrees/s2 in Step S2004 when the acceleration performance limit of the pan drive unit is 500 degrees/s2, the pan control process goes to Step S2006. In contrast, if the pan acceleration is 400 degrees/s2, the pan control process goes to Step S2008.

In Step S2006, the system control unit 1006 calculates an acceleration of electronic pan control based on the acceleration calculated in Step S2004. In the imaging apparatus 2000 of the second embodiment, the acceleration that cannot be realized by the pan drive unit is realized by the video movement through the electronic pan control. Accordingly, the acceleration of the electronic pan control is calculated by subtracting the threshold value of the acceleration in the pan drive unit from a required pan acceleration. For example, when the pan acceleration is 600 degrees/s2 and the threshold value of the acceleration in the pan drive unit is 500 degrees/s2, the acceleration of the electronic pan control is calculated as follows: 600−500=100 degrees/s2.

In Step S2007, the system control unit 1006 instructs the image processing unit 1002 to perform the electronic pan control using the calculated acceleration of the electronic pan control and a specified pan moving direction to perform the electronic pan control indicated in a flowchart in FIG. 9 described below.

In Step S2008, the system control unit 1006 controls the pan drive unit 1004 based on the pan speed, the pan acceleration, and the pan deceleration, which are calculated. Although the acceleration drive in the pan direction is described above, the drive and the deceleration drive in the tilt direction are performed in the same manner. For example, this applies to a case in which the system control unit 1006 determines whether the tilt deceleration is higher than or equal to a predetermined deceleration in Step S2005.

Figure 9:
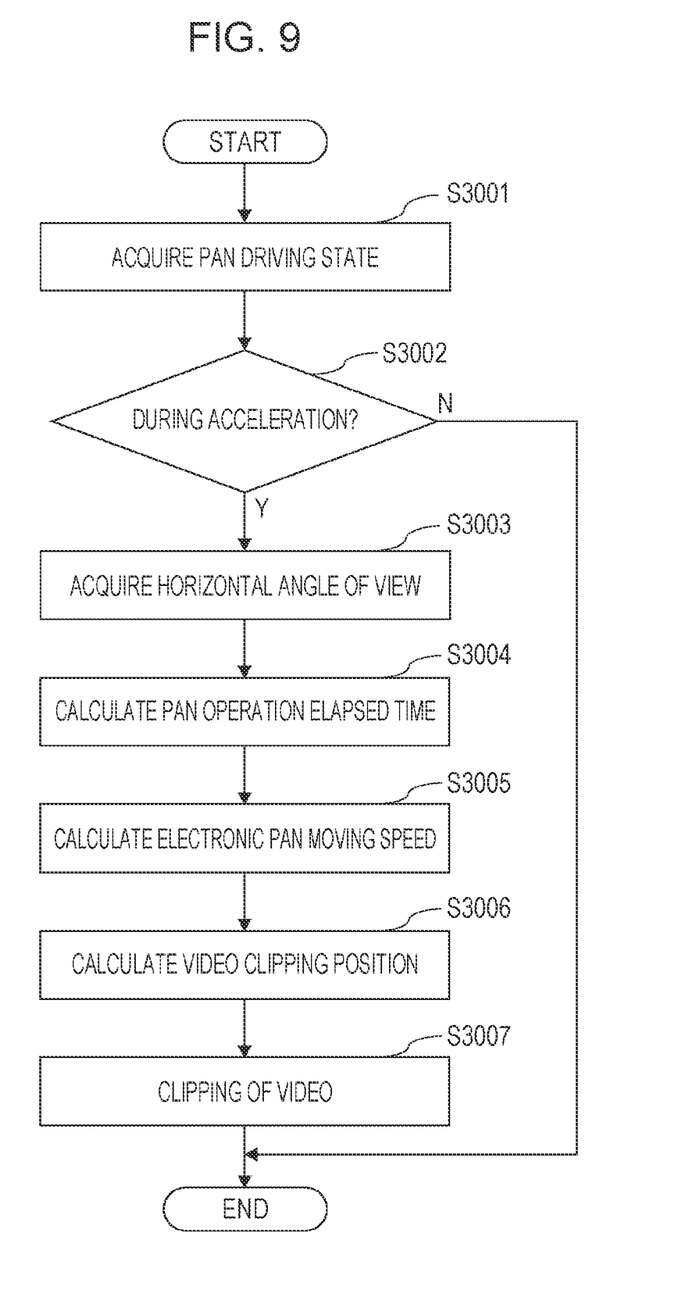
FIG. 9 is a flowchart indicating an electronic pan control process in the imaging apparatus according to the second embodiment.

FIG. 9 is a flowchart indicating the electronic pan control. The flowchart in FIG. 9 is started upon reception of an instruction of the electronic pan control by the image processing unit 1002 in Step S2007. If the electronic pan control process is terminated, the process goes back to the termination of Step S2007 in the flowchart in FIG. 8. In other words, if the acceleration controlled by the system control unit 1006 is higher than or equal to the predetermined acceleration, the video can be clipped through the electronic pan control.

Referring to FIG. 9, in Step S3001, the image processing unit 1002 acquires a pan drive state of the pan drive unit 1004. The pan drive state is any of during stop, during acceleration, during driving at a constant speed, and during deceleration.

In Step S3002, the image processing unit 1002 determines whether the pan drive unit 1004 is performing the acceleration. If the pan drive unit 1004 is performing the acceleration, the electronic pan control process goes to Step S3003. If the pan drive unit 1004 is not performing the acceleration, the electronic pan control process is terminated.

In Step S3003, the image processing unit 1002 acquires the horizontal angle of view of the imaging apparatus 2000. The horizontal angle of view to be acquired here is the horizontal angle of view acquired by the system control unit 1006 in Step S2002 and is, for example, 120 degrees.

In Step S3004, the image processing unit 1002 calculates a pan operation elapsed time. The pan operation elapsed time is represented by a product of a reciprocal of a frame rate and the number of frames since the process has been started. For example, when the frame rate is 60 (frames per second (FPS)), the pan operation elapsed time is calculated from the reciprocal of the frame rate of 60 (FPS) and 9 frames since the process in the flowchart in FIG. 9 has been started as follows: 1/60×9=0.15 s.

In Step S3005, the image processing unit 1002 calculates a moving speed of the electronic pan control. The moving speed of the electronic pan control is represented by a product of the acceleration of the electronic pan control calculated in Step S2006 and the pan operation elapsed time. For example, the moving speed of the electronic pan control at the time of Step S3004 is calculated as follows: 100 degrees/s2×0.15 s=15 degrees/s.

In Step S3006, the image processing unit 1002 calculates a video clipping position. In the electronic pan control, only part of the entire video that is shot is displayed and the video clipping position is changed to a position based on the moving speed to make it seem as though the video is moving from the user. In other words, the video is to be moved by the required number of pixels. At this time, the pixel value to be moved at the moving speed in the electronic pan control is calculated from a product of the horizontal resolution per one degree and the angle of view moved through the electronic pan control. Specifically, the pixel value is represented by a product of a quotient resulting from division of the horizontal resolution, which is the horizontal resolution per one degree, by the horizontal angle of view and the moving speed of the electronic pan control and the reciprocal of the frame rate, which is the time per one frame. For example, when the horizontal resolution of an image that is output from the imaging unit 1001 is 1,920 pixels, the pixel value is calculated from conversion of the amount of movement of the frame at the moving speed of the electronic pan control calculated in Step S3005 as follows: 1,920 pixels/120 degrees×15 degrees/s×(1/60)=four pixels.

In other words, in Step S3007, the image processing unit 1002 clips a region shifted from the video clipping position described above in the specified pan moving direction by the amount corresponding to the calculated pixel value (for example, four pixels) with respect to an image clipping region in the previous frame.

As described above, with the imaging apparatus 2000 of the second embodiment, the electronic pan-tilt control is adopted, in addition to the pan-tilt control. Accordingly, in the electronic pan-tilt control, in addition to the acceleration or the deceleration of the pan-tilt drive unit controlled by the system control unit 1006, it is possible to make the visual acceleration or the visual deceleration of the video movement seem high by clipping the video from the video that is shot. In other words, the video that is shot moves in the same manner during acceleration or deceleration of the PT operation regardless of the angle of view even when the PT acceleration or the PT deceleration exceeding the performance limit of the pan-tilt drive unit is required.

Third Embodiment

In a video delivery system according to a third embodiment, a network camera 3000 is subjected to remote control by a client apparatus 4000 connected to the network camera 3000 via the network 5000. For example, the pan-tilt acceleration and deceleration are controlled in the remote control. The same reference numerals are added to the same components as in the first and second embodiments and a description of such components is appropriately omitted.

Figure 10:
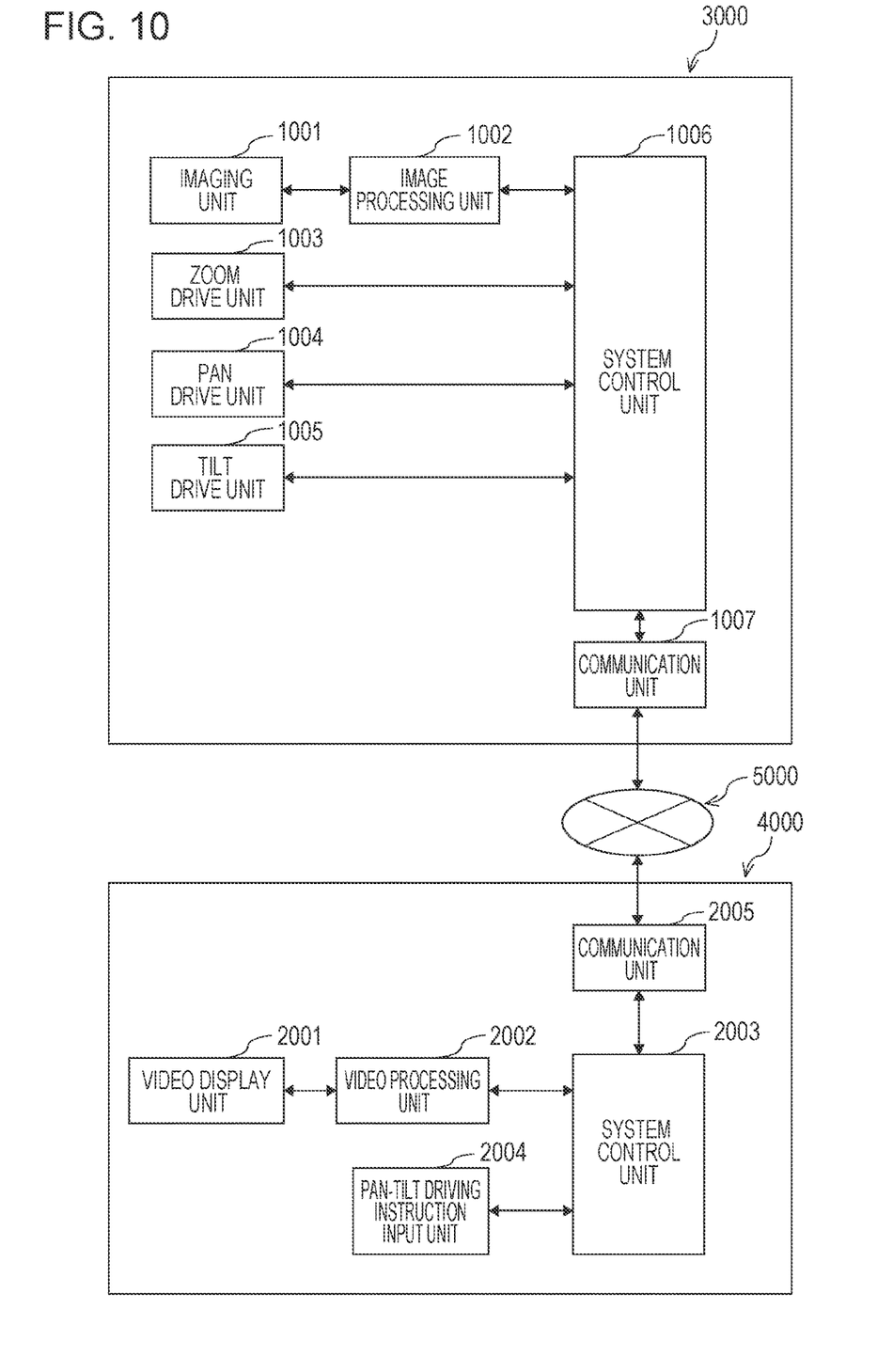
FIG. 10 is a block diagram for describing the configuration of a video delivery system according to a third embodiment.

FIG. 10 is a block diagram for describing the configuration of the video delivery system according to the third embodiment. The video delivery system includes the network camera 3000 and the client apparatus 4000. The network camera 3000 is connected to the client apparatus 4000 via the network 5000 so as to be communicable with the client apparatus 4000.

The network camera 3000 functions as the imaging unit, the zoom drive unit, and the pan-tilt drive unit in the video delivery system. The network camera 3000 includes the imaging unit 1001, the image processing unit 1002, the zoom drive unit 1003, the pan drive unit 1004, the tilt drive unit 1005, the system control unit 1006, and the communication unit 1007. The network camera 3000 can acquire information about the current angle of view from the client apparatus 4000 to set the speed, the acceleration, and the deceleration in each of the pan drive unit 1004 and the tilt drive unit 1005.

The client apparatus 4000, which is connected to the network camera 3000 via the network 5000, acquires information about the network camera 3000 and remotely issues a control instruction to the network camera 3000 for the remote control. The client apparatus 4000 includes a video display unit 2001, a video processing unit 2002, a system control unit 2003, a pan-tilt driving instruction input unit 2004, and a communication unit 2005.

The video display unit 2001 includes a display that displays a video and a control circuit for the display. The video display unit 2001 plays back video data processed by the video processing unit 2002. The video display unit 2001 displays a graphical user interface (GUI) for the pan-tilt operation. Although the settings of the acceleration time and the deceleration time of the pan-tilt operation are accepted with the GUI, an instruction about a driving direction and a driving speed of the pan-tilt drive unit may be input with the GUI. The GUI supplies the pan-tilt drive instruction that is input and the settings of the acceleration time and the deceleration time to the system control unit 2003.

The video processing unit 2002 decomposes encoded video data about the network camera 3000, which is received by the communication unit 2005, to convert the decomposed video data into video data that can be played back.

The system control unit 2003 includes a central processing unit (CPU) and controls the entire client apparatus 4000. The system control unit 2003 receives the video data and information about the control state, such as the angle of view of the camera, from the network camera 3000 via the communication unit 2005. The system control unit 2003 transmits the camera control command to the network camera 3000 via the communication unit 2005.

The pan-tilt driving instruction input unit 2004 includes a joystick capable of performing operations to tilt the camera from left to right and up and down and a control circuit for the joystick. An instruction about the driving direction and the driving speed of the pan-tilt drive unit from the user is input with the joystick. For example, the pan direction is instructed with the left to right direction of the joystick, the tilt direction is instructed with the up and down direction of the joystick, and the driving speed is instructed with the magnitude of the tilt of the joystick. The driving speed is increased as the tilt of the joystick is increased in the pan-tilt driving instruction input unit 2004. The speed specification of 100% by the angle of view ratio is indicated at the maximum tilt and the speed specification of 0% by the angle of view ratio, that is, a stopping state is indicated at no tilt. The speed specified values between the maximum tilt and no tilt are allocated using predetermined steps. The correspondence between the tilt of the joystick and the speed specified value is only an example and is set in consideration of the pan-tilt operational feeling.

The communication unit 2005 is connected to the system control unit 2003 and transmits and receives a control instruction and so on for controlling the system control unit 2003 to and from the system control unit 2003 via the network 5000. For example, the communication unit 2005 transmits the control command to the network camera 3000 and receives a video that is shot by the network camera 3000.

Figure 11:
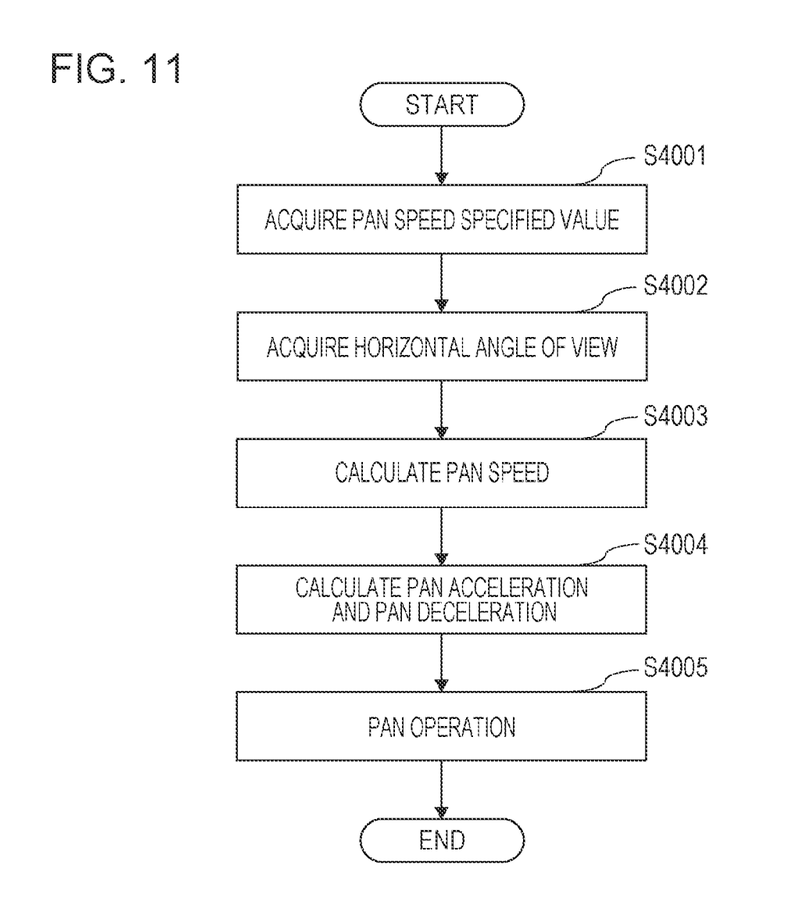
FIG. 11 is a flowchart indicating the pan control process in the third embodiment.

FIG. 11 is a flowchart indicating the pan control of the network camera 3000 of the third embodiment. The flowchart in FIG. 11 is started upon reception of the pan drive instruction from the pan-tilt driving instruction input unit 2004.

Referring to FIG. 11, in Step S4001, the system control unit 2003 acquires the pan speed specified value from the pan-tilt driving instruction input unit 2004. For example, the system control unit 2003 acquires 50%/s as the pan speed specified value by the angle of view ratio.

In Step S4002, the system control unit 2003 acquires the current horizontal angle of view from the network camera 3000. For example, the system control unit 2003 acquires 60 degrees as the current horizontal angle of view of the network camera 3000.

In Step S4003, the system control unit 2003 calculates the pan speed from the acquired horizontal angle of view. The pan speed is represented by a product of the pan speed specified value by the angle of view ratio and the horizontal angle of view. For example, the pan speed is calculated from the pan speed specified value (50%/s) by the angle of view ratio acquired in Step S4001 and the horizontal angle of view (60 degrees) acquired in Step S4002 as follows: the pan speed=50%/s×60 degrees=30 degrees/s.

In Step S4004, the system control unit 2003 calculates the acceleration and the deceleration from the calculated pan speeds and the acceleration time and the deceleration time that are set. The pan acceleration and the pan deceleration are represented by a quotient resulting from division of the pan speed by the pan acceleration time and a quotient resulting from division of the pan speed by the pan deceleration time, respectively. For example, the pan acceleration is calculated from the pan speed (30 degrees/s) calculated in Step S4003 when the horizontal angle of view is 60 degrees and the acceleration time of is as follows: the pan acceleration=30 degrees/s/1 s=30 degrees/s2.

The pan deceleration is calculated from the pan speed (30 degrees/s) calculated in Step S4003 when the horizontal angle of view is 60 degrees and the deceleration time of is as follows: the pan deceleration=30 degrees/s/is =30 degrees/s2.

Figure 12:
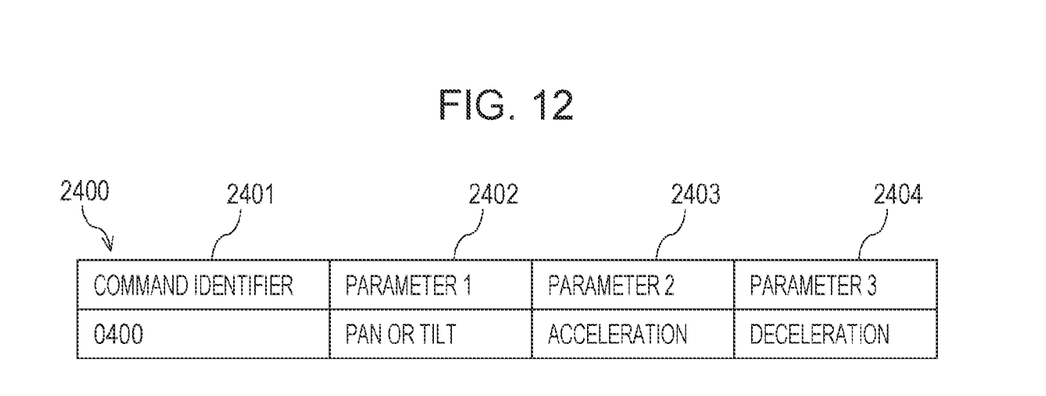
FIG. 12 is a table indicating a control command for pan-tilt acceleration-deceleration settings in the imaging apparatus.

In Step S4005, the system control unit 2003 controls the pan drive unit 1004 based on the pan speed, the pan acceleration, and the pan deceleration, which are calculated, and controls the tilt drive unit 1005 based on the tilt speed, the tilt acceleration, and the tilt deceleration, which are calculated. FIG. 12 is a table indicating a control command 2400 for pan-tilt acceleration-deceleration settings of the imaging apparatus. The system control unit 2003 interprets the control command based on the values calculated in Step S4003 and Step S4004 to perform the specified control. The control commands include the command 2100 indicating the pan-tilt drive instruction, the command 2200 indicating the pan-tilt speed specification by the angle of view ratio, and the command 2300 indicating the pan-tilt acceleration-deceleration time settings.

The control command 2400 is a command indicating the pan-tilt acceleration-deceleration settings. The control command 2400 includes a command identifier 2401, a parameter 2402, a parameter 2403, and a parameter 2404.

The command identifier 2401 is a command for identifying the kind of the command. For example, "0400" indicates a command for setting the acceleration and the deceleration of the PT. The parameter 2402 is a parameter indicating the direction type. A value indicating the pan or the tilt is specified for the parameter 2402. The parameter 2403 is a parameter indicating the acceleration. The acceleration to accelerate to a specified speed is specified for the parameter 2403 in units of millidegrees/s2. The parameter 2404 is a parameter indicating the deceleration. The deceleration to decelerate from a specified speed is specified for the parameter 2404 in units of millidegrees/s2.

All the parameters in the control command 2400 may be input by the user or part or all of the parameters may be automatically specified, as in the command 2300 and so on. For example, a setting unit used by the user to set the acceleration in the parameter 2403 may be provided.

As described above, with the video delivery system of the third embodiment, the network camera 3000 can perform the pan-tilt control using the client apparatus 4000 via the network 5000. Accordingly, it is possible to set the acceleration and the deceleration so that the acceleration time and the deceleration time are made constant at different angles of view even if the imaging unit is not integrated with a pan-tilt control unit. Specifically, installing only the imaging unit in the imaging apparatus and controlling the multiple imaging apparatuses with the client apparatus having one pan-tilt control unit installed therein enable the manufacturing cost of the imaging apparatus to be reduced and enable batch control of the imaging apparatuses.

OTHER EMBODIMENTS

The aspect of the embodiments is also realized by performing the following process. Specifically, a program realizing the functions of the above embodiments is supplied to a system or an apparatus via a network or various recording media and the computer (the CPU or a micro processing unit (MPU)) in the system or the apparatus reads out the program code for execution. In this case, the program and the recording medium storing the program compose the aspect of the embodiments.

Although the case is described in the embodiments of the disclosure in which the acceleration time is equal to the deceleration time, the acceleration time may be different from the deceleration time. For example, inequality expression Ta>Td may be established where the acceleration time is denoted by Ta and the deceleration time is denoted by Td.

According to the embodiments described above, it is possible to reduce the feeling of strangeness for the video that is shot.

Embodiments of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-170628 filed Oct. 8, 2020, which is hereby incorporated by reference herein in its entirety.

What is claimed is:

1. An apparatus comprising:
an imaging unit configured to capture an image;
a zoom drive unit configured to control an angle of view of the imaging unit;
a pan-tilt drive unit configured to rotate the imaging unit in a pan direction or a tilt direction; and
a control unit configured to control a rotation of the pan-tilt drive unit in the pan direction or the tilt direction,
wherein the control unit obtains a target speed of the rotation of the pan-tilt drive unit, the target speed being a speed of the rotation to be reached, and the target speed being derived based on a current size of the angle of view,
wherein a first target speed is derived as the target speed of the rotation in a state where the current size of the angle of view is a first size, and a second target speed smaller than the first target speed is derived as the target speed of the rotation in a state where the current size of the angle of view is a second size smaller than the first size,
wherein the control unit controls an acceleration of the rotation of the pan-tilt drive unit so that a speed of the rotation reaches the first target speed in a state where the current size of the angle of view is the first size, and controls the acceleration of the rotation so that the speed of the rotation reaches the second target speed in a state where the current size of the angle of view is the second size, and
wherein the acceleration is controlled so that an acceleration time of the acceleration of the rotation is made constant regardless of whether the acceleration is for reaching the first target speed or the second target speed.

2. The apparatus according to claim 1,
wherein the control unit controls a deceleration of the rotation from the first target speed in a state where the current size of the angle of view is the first size, and controls the deceleration of the rotation from the second target speed in a state where the current size of the angle of view is the second size, and
wherein the deceleration is controlled so that a deceleration time of the deceleration of the rotation is made constant regardless of whether the deceleration is from the first target speed or the second target speed.

3. The apparatus according to claim 1,
wherein the first target speed is derived by using a predetermined value and the first size, and the second target speed is derived by using said predetermined value and the second size.

4. The apparatus according to claim 1, further comprising:
an electronic control unit configured to generate a video clipped at an arbitrary position from a video shot by the imaging unit,
wherein the electronic control unit generates a video in which a visual acceleration time of a video movement is made constant by clipping a video from the video shot by the imaging unit to control a visual acceleration of the video movement, in addition to the acceleration controlled by the control unit.

5. The apparatus according to claim 4,
wherein the electronic control unit clips the video if the acceleration controlled by the control unit is higher than or equal to a predetermined acceleration.

6. A system comprising:
an imaging unit configured to capture an image;
a zoom drive unit configured to control an angle of view of the imaging unit;
a pan-tilt drive unit configured to rotate the imaging unit in a pan direction or a tilt direction;
a control unit configured to control a rotation of the pan-tilt drive unit in the pan direction or the tilt direction;
a transmission-reception unit configured to transmit and receive a control instruction of the imaging unit and a state of the imaging unit; and
a remote control unit configured to issue a remote control instruction of the control unit via the transmission-reception unit,
wherein the control unit obtains a target speed of the rotation of the pan-tilt drive unit, the target speed being a speed of the rotation to be reached, and the target speed being derived based on a current size of the angle of view,
wherein a first target speed is derived as the target speed of the rotation in a state where the current size of the angle of view is a first size, and a second target speed smaller than the first target speed is derived as the target speed of the rotation in a state where the current size of the angle of view is a second size smaller than the first size,
wherein the control unit controls an acceleration of the rotation so that a speed of the rotation reaches the first target speed in a state where the current size of the angle of view is the first size, and controls the acceleration of the rotation so that the speed of the rotation reaches the second target speed in a state where the current size of the angle of view is the second size, and
wherein the acceleration is controlled so that an acceleration time of the acceleration of the rotation is made constant.

7. The system according to claim 6, further comprising:
an electronic control unit configured to generate a video clipped at an arbitrary position from a video shot by the imaging unit,
wherein the electronic control unit generates a video in which a visual acceleration time of a video movement is made constant by clipping a video from the video shot by the imaging unit to control a visual acceleration of the video movement, in addition to the acceleration controlled by the control unit.

8. The system according to claim 7,
wherein the electronic control unit clips the video if the acceleration controlled by the control unit is higher than or equal to a predetermined acceleration.

9. A method of controlling an apparatus including an imaging unit, the method comprising:
capturing an image;
performing zoom drive to control an angle of view in the capturing;
performing pan-tilt drive to rotate the imaging unit in a pan direction armor a tilt direction in the capturing; and
performing control to control a rotation in the pan direction or the tilt direction in the pan-tilt drive,
wherein the control obtains a target speed of the rotation, the target speed being a speed of the rotation to be reached, and the target speed being derived based on a current size of the angle of view, wherein a first target speed is derived as the target speed of the rotation in a state where the current size of the angle of view is a first size, and a second target speed smaller than the first target speed is derived as the target speed of the rotation in a state where the current size of the angle of view is a second size smaller than the first size, wherein the control controls an acceleration of the rotation so that a speed of the rotation reaches the first target speed in a state where the current size of the angle of view is the first size, and controls the acceleration of the rotation so that the speed of the rotation reaches the second target speed in a state where the current size of the angle of view is the second size, and wherein the acceleration is controlled so that an acceleration time of the acceleration of the rotation is made constant regardless of whether the acceleration is for reaching the first target speed or the second target speed.

10. The method according to claim 9, further comprising:
generating a video clipped at an arbitrary position from a video shot by the imaging unit,
wherein the generating generates a video in which a visual acceleration time of a video movement is made constant by clipping a video from the video shot by the imaging unit to control a visual acceleration of the video movement, in addition to the acceleration controlled by the performing control.

11. The method according to claim 10,
wherein the generating clips the video if the acceleration controlled by the performing control is higher than or equal to a predetermined acceleration.

12. A computer-readable non-transitory recording medium storing a program causing a computer to perform a method of controlling an apparatus including an imaging unit,
wherein the method includes
capturing an image,
performing zoom drive to control an angle of view in the capturing,
performing pan-tilt drive to rotate the imaging unit in a pan direction or a tilt direction in the capturing, and
performing control to control a rotation in the pan direction or the tilt direction in the pan-tilt drive;
wherein the control obtains a target speed of the rotation, the target speed being a speed of the rotation to be reached, and the target speed being derived based on a current size of the angle of view,
wherein a first target speed is derived as the target speed of the rotation in a state where the current size of the angle of view is a first size, and a second target speed smaller than the first target speed is derived as the target speed of the rotation in a state where the current size of the angle of view is a second size smaller than the first size,
wherein the control controls an acceleration of the rotation so that a speed of the rotation reaches the first target speed in a state where the current size of the angle of view is the first size, and controls the acceleration of the rotation so that the speed of the rotation reaches the second target speed in a state where the current size of the angle of view is the second size, and
wherein the acceleration is controlled so that an acceleration time of the acceleration of the rotation is made constant regardless of whether the acceleration is for reaching the first target speed or the second target speed.

13. The computer-readable non-transitory recording medium according to claim 12, further comprising:
generating a video clipped at an arbitrary position from a video shot by the imaging unit,
wherein the generating generates a video in which a visual acceleration time of a video movement is made constant by clipping a video from the video shot by the imaging unit to control a visual acceleration of the video movement, in addition to the acceleration controlled by the performing control.

14. The computer-readable non-transitory recording medium according to claim 13, listing
wherein the generating clips the video if the acceleration controlled by the performing control is higher than or equal to a predetermined acceleration.

* * * * *